United States Patent [19]
Stay

[11] Patent Number: 5,558,069
[45] Date of Patent: Sep. 24, 1996

[54] METHOD AND APPARATUS FOR FLUID TEMPERATURE CONTROL

[75] Inventor: Kevin E. Stay, Brighton, Mich.

[73] Assignee: Livernois Research & Development Company, Dearborn, Mich.

[21] Appl. No.: 555,616

[22] Filed: Nov. 9, 1995

[51] Int. Cl.⁶ ................................................ F02M 31/00
[52] U.S. Cl. ........................................ 123/541; 123/557
[58] Field of Search ................................ 123/541, 542, 123/557, 545, 546, 547

[56] References Cited

U.S. PATENT DOCUMENTS

| | | |
|---|---|---|
| 2,994,311 | 8/1961 | Shuck . |
| 4,036,182 | 7/1977 | Gandy . |
| 4,072,138 | 2/1978 | Hawkins et al. ................ 123/541 |
| 4,898,141 | 2/1990 | Fiedler . |
| 4,924,838 | 5/1990 | McCandless . |
| 4,938,036 | 7/1990 | Hodgkins et al. ............... 123/541 |
| 5,251,603 | 10/1993 | Watanabe et al. . |
| 5,368,003 | 11/1994 | Clemente . |
| 5,377,483 | 1/1995 | Mowill . |

*Primary Examiner*—Marguerite McMahon
*Attorney, Agent, or Firm*—Brooks & Kushman PC

[57] ABSTRACT

An apparatus and method for cooling or heating fluids, such as fuel in a fuel system of an automotive vehicle. Compressed gas is delivered to a vortex tube or air amplifier 14 so that the gas rapidly expands and cools, thereby cooling a first end 16 of the vortex tube 14 in relation to a warmer second end thereof 18. A first fuel inlet port 20 of a first heat exchanger 16 lies proximate the first end 16 so that fuel flowing into the inlet port 20 is cooled by thermal contact with the first end 16 of the vortex tube 14. A cooled fuel outlet port 22 in the heat exchanger 16 lies proximate the first end 16 so that cooled fuel may leave the heat exchanger 16 for delivery to an engine. A valve with an upstream gate 26 and two downstream gates 28,30 is located so that fuel is selectively delivered to the first fuel inlet port 20 through the upstream gate 26 and one of the two downstream gates 28,30 if cooling of the fuel is desired. The second downstream gate 30 is connected to a second fuel inlet port 34 in a second heat exchanger 18 so that fuel flowing therethrough is warmed thereby if heating of the fuel is desired. A warmed fuel outlet port 36 is provided in the second heat exchanger so that warmed fuel may leave the second heat exchanger 18. A temperature sensor 40 and valve controller are in communication with the valve.

23 Claims, 3 Drawing Sheets

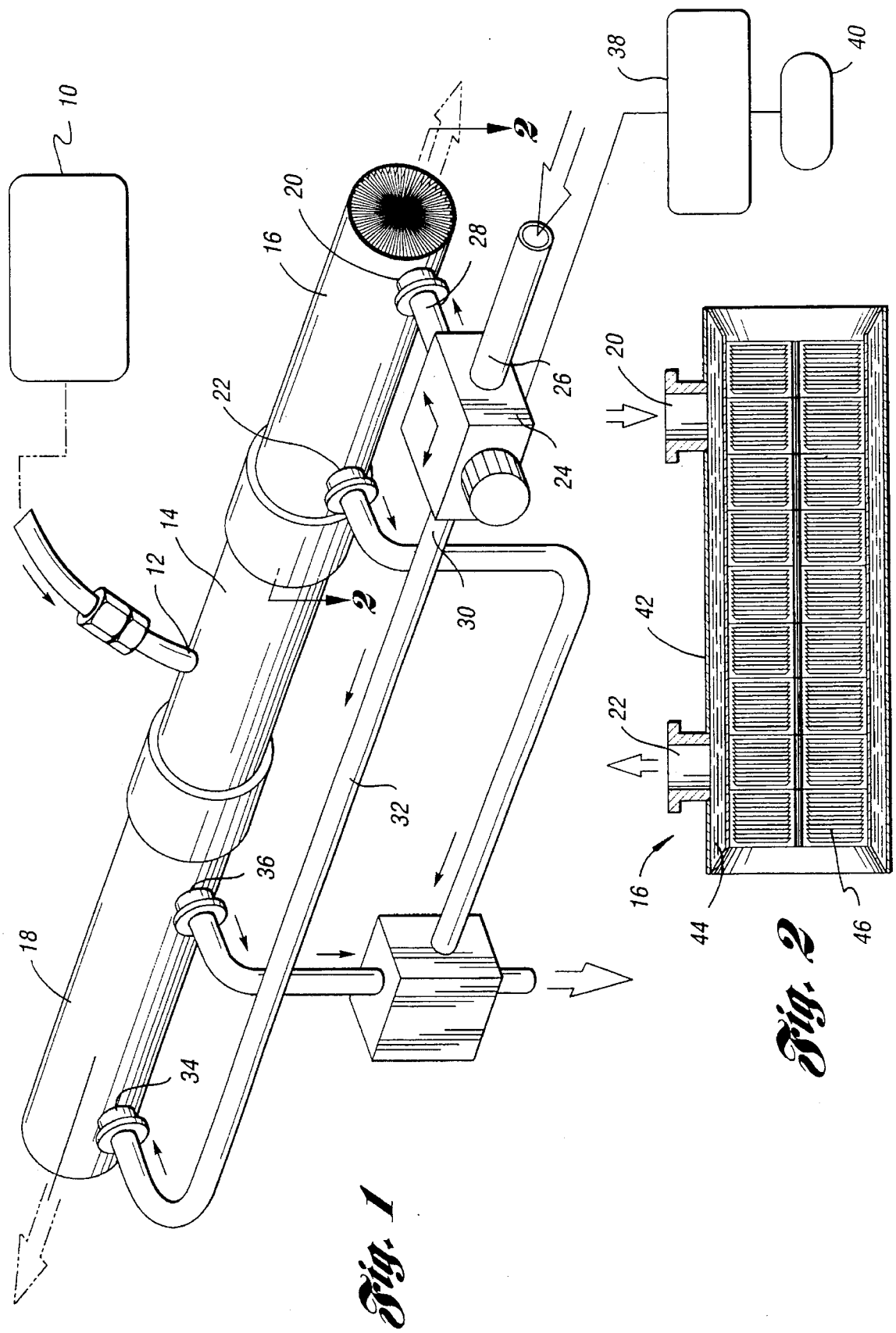

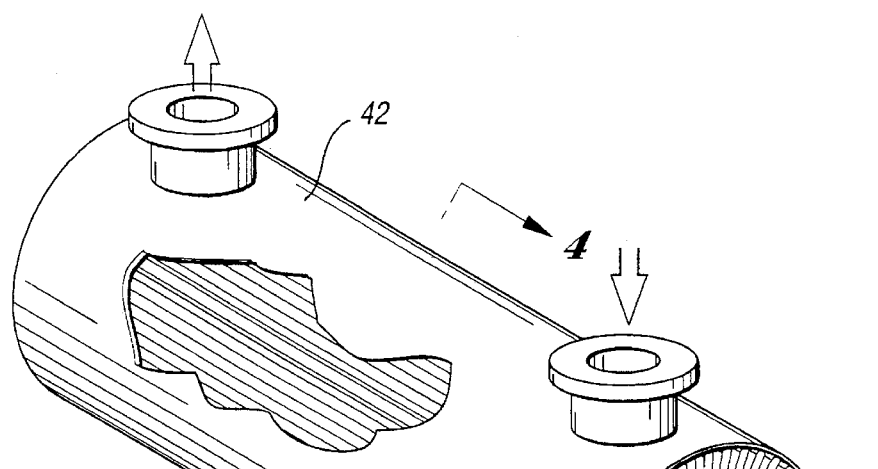
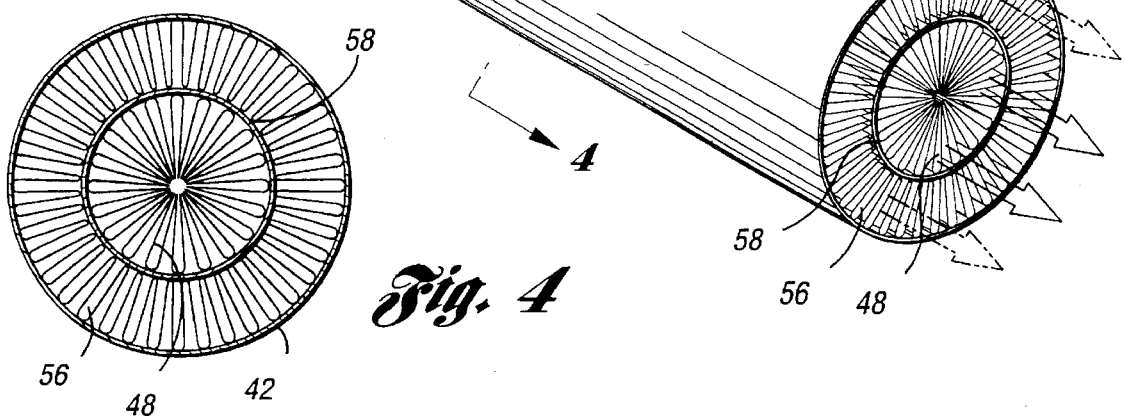
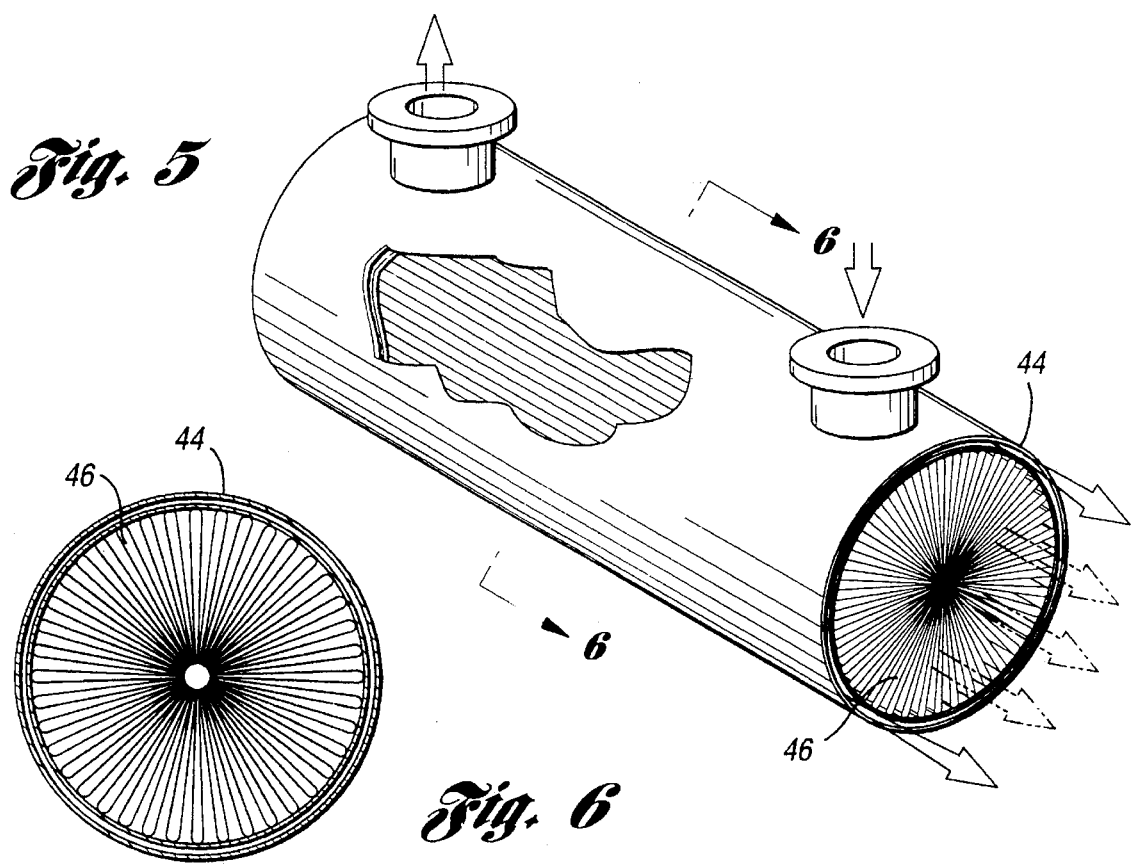

METHOD AND APPARATUS FOR FLUID TEMPERATURE CONTROL

TECHNICAL FIELD

This invention relates to a method and apparatus for cooling and heating fluids, such as fuel for an engine.

BACKGROUND ART

In an internal combustion engine, engine performance is influenced significantly by the temperature of the fuel used thereby. Elevated temperatures decrease fuel density, which makes combustion less efficient. Additionally, fuel mass droplet size decrease with fuel density, as does flow rate, which results in less spray penetration.

Today's diesel engines, especially those used in class 6, 7, and 8 trucks, have a very high injection pressure. This high pressure causes the fuel to become heated to undesirable temperatures. An injector pump pressurizes fuel to the injectors. The injectors only use 10–15% of the fuel that is provided to the injectors. The remaining 85–90% of the fuel is returned to the tank at a lower pressure, but still at an elevated temperature. This is not an insurmountable problem until the tank temperature or the fuel temperature increase beyond approximately 150° F. At or beyond this point, various problems occur within the fuel. Also, its combustion efficiency may decline. This is a major truck industry concern which has not yet been solved satisfactorily through conventional cooling methods.

The primary problem with fuel cooling is that one cannot mount an air-to-fuel cooler in the front of the vehicle or in the main cooling air stream due to the possibility of leaks or front-end collisions which may cause leaks to occur. This would be a simple and inexpensive means to cool the fuel, but is not practical or safe.

It is undesirable to use conventional outlet water from the engine cooling system because the temperature of the radiator typically exceeds 150° F., even at the outlet. For heat transfer to occur, there must be a significant temperature differential between the fuel being returned to the tank and the water being used to cool it.

Another conventional cooling alternative would be to use the air conditioning system. This too has some drawbacks because all trucks do not come equipped with air conditioning.

During winter conditions it may become necessary to warm the fuel, especially during engine start up. In cold environments, diesel fuels become jelled and may cause fuel systems to freeze up. Conventional cooling methods described above do not provide for heating fuel when necessary.

Representative of prior art approaches to the above-noted problems are found in the disclosures of U.S. Pat. Nos. 4,036,182; 4,924,838; 4,898,141; 5,368,003; 5,251,603; and 2,994,331.

SUMMARY OF THE INVENTION

It is an object of the invention to provide a fuel temperature control system. More specifically, the invention combines two technologies in a manner that provides a solution to any conventional cooling system. The invention also provides a means to provide both cooling and heating through utilization of one power source, i.e., compressed air.

The invention is a method and apparatus for cooling or heating fluids, such as fuel in the fuel system of an automotive vehicle.

The method comprises the following steps: (a) connecting a supply of compressed gas to a vortex tube or air amplifier so that the gas rapidly expands and cools, thereby cooling a first end of the vortex tube in relation to a warmer second end; (b) providing a first fuel inlet port in a first heat exchanger proximate the first end of the vortex tube so that fuel flowing into the fuel inlet port is cooled by thermal contact with the first end of the vortex tube; (c) providing a cooled fuel outlet port at the first end so that cooled fuel may leave the first heat exchanger; (d) locating a valve having an upstream gate and two downstream gates so that fuel is selectively delivered to the first fuel inlet port through the upstream gate and one of the two downstream gates if cooling of the fuel is desired; (e) providing a passage from the second downstream gate to a second fuel inlet port in a second heat exchanger at the second end of the vortex tube so that fuel selectively flowing therethrough is warmed by the second end of the vortex tube; and (f) providing a warmed fuel outlet port at the second end so that warmed fuel may leave the second heat exchanger for delivery to an engine.

To implement the above method, the following apparatus is provided: (a) a supply of compressed gas connected to the vortex tube; (b) a first fuel inlet port in a first heat exchanger proximate a first end of the vortex tube connected so that fuel flowing into the fuel inlet port is cooled by thermal contact with the first end; (c) an outlet port for cooled fuel so that cooled fuel may leave the first heat exchanger; (d) a valve for selectively delivering fuel to the first end for cooling or to the second heat exchanger for heating the fuel; and (e) an outlet port for warmed fuel thereby allowing warmed fuel to leave the second heat exchanger for delivery to an engine.

Additional objects and advantages of the present invention will be apparent from the following description considered in connection with the accompanying drawings.

BRIEF DESCRIPTION OF THE DRAWINGS

FIG. 1 is a perspective view of an apparatus according to the present invention for cooling or heating fluids, such as fuel in a fuel system of vehicle;

FIG. 2 is an axial cross-sectional view of a fuel cooling portion of the embodiment depicted in FIG. 1 along the line 2—2 thereof;

FIG. 3 is an alternate embodiment of the portion shown in FIG. 2;

FIG. 4 is a transverse cross-sectional view of the embodiment depicted in FIG. 3 along the line 4—4 thereof;

FIG. 5 is a perspective view of the embodiment depicted in FIG. 2;

FIG. 6 is a transverse cross-sectional view of the embodiment depicted in FIG. 5 along the line 6—6 thereof;

BEST MODE FOR CARRYING OUT THE INVENTION

Figure 7:
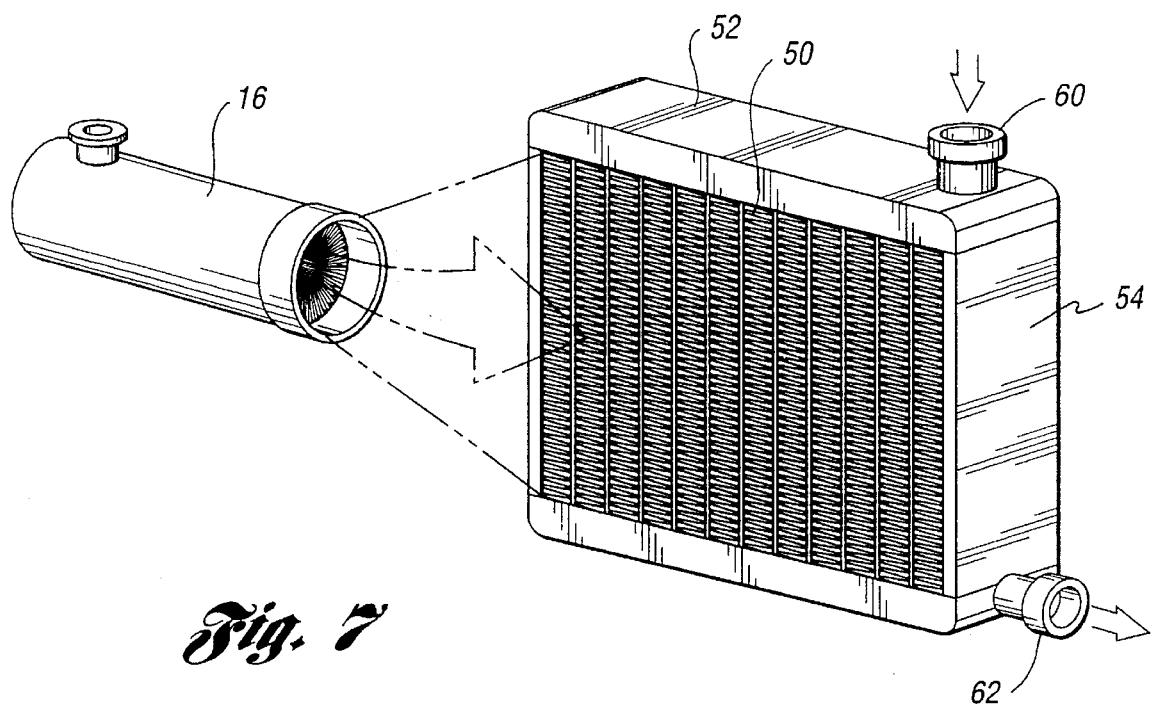
FIG. 7 depicts an embodiment of the present invention wherein a conventional heat exchanger has a core which provides downflow and sideflow of the fluid to be cooled.

With the above-mentioned drawbacks of conventional methods of cooling, a need for some other means of fluid temperature control has arisen.

According to the method of the present invention, fuel in the fuel system of a vehicle can be cooled by connecting a supply of compressed gas 10 (FIG. 1) to a gas inlet port 12 of a vortex tube or air amplifier 14 so that the gas rapidly expands and cools within the tube. A first end becomes cool in relation to a warmer second end as the compressed air rapidly expands. Connected to the first end is a first heat exchanger 16. A second heat exchanger 18 is connected to the second end of the vortex tube.

A first fluid or fuel inlet port 20 (FIGS. 1–2) is provided in the first heat exchanger 16 so that fuel flowing in to the fuel inlet port 20 is cooled by thermal contact through heat exchanging media with the first end of the vortex tube 14. An outlet port 22 for cooled fuel is provided so that cooled fuel may leave the first heat exchanger 16 for delivery to an engine.

The method of the present invention also contemplates heating fuel when desired. To heat or simultaneously cool and heat, a valve means 24, such as a conventional three-way valve, is provided with an upstream gate 26 and two downstream gates 28, 30 so that fluid or fuel is selectively delivered to the first fuel inlet port 20 to cool the fuel through the upstream gate 26 and one of the two downstream gates 28.

Connecting the second downstream gate 30 to a second fluid or fuel inlet port 34 in the second heat exchanger is a passage, or conduit 32. Fluid or fuel selectively flowing therethrough is warmed by the second end of the vortex tube 14. An outlet port 36 for warmed fuel is provided so that warmed fuel may leave the second heat exchanger 14 for delivery to a system operable therewith, such as an engine.

In one embodiment of the apparatus, control means 38, such as microcontroller, microcomputer or microprocessor, is connected to the valve 24 for directing fluid or fuel flow through one or both of the downstream gates 28, 30 of the valve 24 to effect cooling or heating in response to a signal generated by a fuel temperature sensor 40. In this embodiment, the control means 38 may include a processor with control logic to open one or both of the two downstream gates 28, 30 based on the signal from the fuel temperature sensor 40. It will readily be appreciated that such control logic can be implemented by software, hardware, or a combination thereof.

Turning now to FIGS. 2 and 5–6, in one embodiment of the invention, the first heat exchanger 16 connected to the vortex tube 14 comprises a heat exchanging tube 42 within which fuel to be cooled may pass through an annular internal passage 44. To promote efficiency of heat exchange, a turbulator (heat exchanger louvered fins) 46 is disposed within the heat exchanging tube 42.

An alternate embodiment of the present invention is depicted in FIGS. 3–4. In that embodiment; fluid or fuel to be cooled passes along an annular passage 44 supported between radially mounted fins 48 within a central bore of the heat exchanging tube 42. Annularly mounted fins 56 are provided in an annular space between an inner tube 58 and the heat exchanging tube 42.

The above discussion of the alternate embodiments indicate that the device can be configured in many ways to provide the desired air flow and outlet temperatures.

In FIGS. 3–4, the external air or gas-deflecting fins 56 are bonded to the external wall of the tube 58. These fins are covered with another tube 42 which serves several purposes. One is to hold the external air fins in contact with the external tube wall during the bonding process. A second purpose is to direct the air from the vortex tube 14 through the external air fins 56. This external tube can also be formed (FIGS. 7–8) in such a manner as to provide a plenum or connection volume between a heat exchanger or radiator 50 and the first (cooled) end 16 of the vortex tube 14.

This invention solves the need for an integrated fuel cooling/heating unit for fluid temperature control and does not add heat load to existing cooling systems. It is a system which can be effectively field installed in existing vehicles as well as in new O.E.M. vehicles.

Another advantage is that the invention can be mounted in a safe area that will remain undamaged during a collision, such as inside the frame rails. It does not require ambient air, such as at the front end of a vehicle to provide cold air to the heat exchanger. This type of device can be used in any application requiring fuel temperature control as long as a source of compressed air is available. All class 6, 7 and 8 trucks use air compression systems for their air brakes. That air compressor may also provide sufficient air pressure for the disclosed fuel temperature control system to work effectively. Optionally, a dedicated air compressor system may be employed where the existing system does not have adequate capacity.

As noted earlier, the invention can be used as a fuel heater. Several manufacturers currently build fuel heaters, but none produce a unit for both cooling and heating.

Furthermore, an additional heat exchanger could be placed on the warm end 18, or the air flow from that end could be baffled or routed into the existing cooler. Through the disclosed combination, both the fuel cooler and fuel heater can be in one combined unit. Multiple configurations can be envisioned to plumb either the air flows and/or the liquid flows to effectively heat or cool.

As depicted in FIG. 1, the cold gas is furnished by a vortex device 14. The vortex device conventionally includes a vortex tube having an inlet 12 which receives compressed air, typically at about 70° F. Incoming air is delivered to a vortex-generation chamber (not shown) from which cold air emerges via end 16 in a cooled stream, typically at about −50° F. Warm air exhausts from the warm outlet 18, typically at about 200° F. Sources of vortex tubes include ITW Vortec, Cincinnati, Ohio and ARTX, Fairfield, Ohio. Other suitable devices are available from EXAIR Corporation, also Cincinnati, Ohio.

Such designs operate on the vortex principle of fluid rotating about an axis. The vortex tube creates a vortex from compressed air and separates it into two streams—one hot and one cold. In operation, compressed air or an inert gas enters a cylindrical generator where it causes the air to rotate. Rotating air is forced down the inner walls of hot tube at speeds reaching 1,000,000 rpm.

At the end of the hot tube 18, a small portion of this air exits through a needle valve (not shown) as hot air exhaust. The remaining air is forced back to the center of the incoming air stream at a slower speed. The heat from the slower moving air is transferred to the faster moving incoming air. The super-cooled air flows through the center of the generator and exits through the cold air exhaust port at end 16. The tube operates on filtered compressed air at about 100 psig. Preferably, gas is supplied to the vortex tube 14 at a pressure of approximately 10–120 psig. Typically used gases include air, nitrogen, argon, and carbon dioxide.

In an alternative embodiment of the disclosed apparatus for fluid temperature control, an air amplifier may be connected to a heat exchanger instead of the vortex tube if cooling is desired. One suitable air amplifier is available from ARTX, Ltd. in Fairfield, Ohio. Such devices release a small amount of compressed air at near-sonic velocity through an adjustable, internal, ring-shaped nozzle. The high-speed "tubes" of air released through the front of the apparatus leave behind a strong vacuum, pulling additional surrounding air through the rear of the amplifier, while pushing the ambient air in front.

Figure 8:
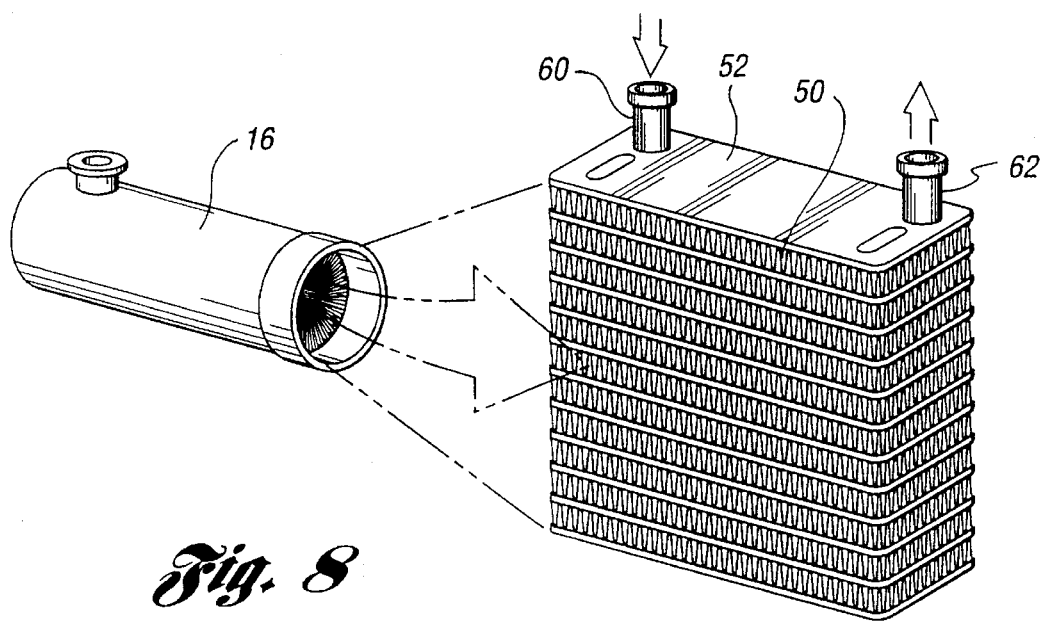
FIG. 8 depicts a heat exchanger configuration in which the flow of fluids to be cooled is substantially parallel.

In FIGS. 7 and 8, the vortex tube 14 is connected to a heat exchanger or radiator 50 via a plenum 64. In FIG. 7, fluid to be cooled enters the heat exchanger or radiator 50 at inlet 60 and leaves at outlet 62. The radiator of that configuration has a core which provides down flow and side flow of the fluid to be cooled. FIG. 8 depicts a plate-type heat exchanger configuration in which incoming and exiting fluid flows are parallel.

While the best mode for carrying out the invention has been described in detail, those familiar with the art to which this invention relates will recognize various alternative designs and embodiments for practicing the invention as defined by the following claims.

What is claimed is:

1. A method for heat transfer in the fuel of a fuel system, comprising:

connecting a supply of compressed gas to a gas inlet port of a vortex tube so that the gas rapidly expands and cools, thereby cooling a first end of the vortex tube in relation to a warmer second end of the vortex tube;

attaching a first heat exchanger to the first end of the vortex tube;

providing a first fuel inlet port in the first heat exchanger so that fuel flowing into the first fuel inlet port is cooled by thermal contact with the first end of the vortex tube; and providing a cooled fuel outlet port in the heat exchanger so that cooled fuel may leave the first heat exchanger.

2. The method of claim 1, further comprising:

locating a valve having an upstream gate and two downstream gates so that fuel is selectively delivered to the first fuel inlet port of the heat exchanger through the upstream gate and one of the two downstream gates;

attaching a second heat exchanger to the second end of the vortex tube;

connecting the other downstream gate to a second fuel inlet port in the second heat exchanger so that fuel selectively flowing through the second fuel inlet port is warmed by the warmer second end of the vortex tube; and providing a warmed fuel outlet port so that warmed fuel may leave the second heat exchanger.

3. A method for cooling or heating a fluid to provide a temperature-controlled fluid, comprising:

connecting a supply of compressed gas to a vortex tube so that the gas rapidly expands and cools, thereby cooling a first end of the vortex tube in relation to a warmer second end of the vortex tube;

connecting a first heat exchanger to the first end and a second heat exchanger to the second end;

providing a first fluid inlet port in the first heat exchanger so that fluid flowing into the first fluid inlet port is cooled by thermal contact with the first end of the vortex tube;

providing a cooled fluid outlet port in the first heat exchanger so that cooled fluid may leave the first heat exchanger;

locating a valve having an upstream gate and two downstream gates so that fluid is selectively delivered to the first fluid inlet port through the upstream gate and one of the two downstream gates to cool the fluid;

providing a passage from the second downstream gate to a second fluid inlet port in the second heat exchanger so that fluid selectively flowing therethrough is warmed by the second end of the vortex tube; and providing a warmed fluid outlet port so that warmed fluid may leave the second heat exchanger for delivery to a system to which the temperature-controlled fluid is delivered.

4. A fuel temperature control system comprising:

a vortex tube connected to a supply of compressed gas so that the gas rapidly expands and cools, thereby cooling a first end of the vortex tube in relation to a warmer second end of the vortex tube;

a first and second heat exchanger connected to the ends of the vortex tube;

a first fuel inlet port in a first heat exchanger proximate the first end connected so that fuel flowing into the first fuel inlet port is cooled by thermal contact with the first end of the vortex tube;

an outlet port for cooled fuel in the first heat exchanger so that cooled fuel may leave the first heat exchanger;

valve means for delivering fuel, the valve means having an upstream gate and two downstream gates connected so that fuel is selectively delivered to the first fuel inlet port to cool the fuel through the upstream gate and one of the two downstream gates;

a passage connecting the second downstream gate and a second fuel inlet port in a second heat exchanger so that fuel flowing therethrough is warmed by the second end of the vortex tube;

an outlet port in the second heat exchanger for warmed fuel so that warmed fuel to leave the second heat exchanger; and control means connected to the valve means for directing fuel flow through one or both of the downstream gates of the valve means to effect cooling or heating of the fuel in response to a signal generated by a fuel temperature sensor.

5. An apparatus for cooling or heating fuel in a fuel system of a vehicle, comprising:

a vortex tube connected to a supply of compressed gas so that the gas rapidly expands and cools, thereby cooling a first end of the vortex tube in relation to a warmer second end of the vortex tube;

a first and second heat exchanger connected to the ends of the vortex tube;

a first fuel inlet port in a first heat exchanger proximate the first end connected so that fuel flowing into the first fuel inlet port is cooled by thermal contact with the first end of the vortex tube;

an outlet port for cooled fuel in the first heat exchanger so that cooled fuel may leave the first heat exchanger;

valve means for delivering fuel, the valve means having an upstream gate and two downstream gates connected so that fuel is selectively delivered to the first fuel inlet port to cool the fuel through the upstream gate and one of the two downstream gates;

a passage connecting the second downstream gate and a second fuel inlet port in a second heat exchanger so that fuel flowing therethrough is warmed by the second end of the vortex tube; and an outlet port in the second heat exchanger for warmed fuel so that warmed fuel to leave the second heat exchanger.

6. The apparatus of claim 5 wherein the first heat exchanger includes:

an annular passage along which fuel to be cooled may pass.

7. The apparatus of claim 6 further comprising:

a turbulator within the heat exchanging tube to promote heat transfer.

8. The apparatus of claim 7 further comprising:

radially mounted fins within the turbulator to promote heat transfer.

9. The apparatus of claim 5 wherein the first heat exchanger includes:

an inner tube having an internal passage along which gas cooled may pass;

an outer concentric tube surrounding the inner tube along which cooled gas may pass; and an annular passage supported between the inner and outer tubes through which fuel to be cooled may pass.

10. The apparatus of claim 9 further comprising:

radially mounted fins within the inner tube.

11. The apparatus of claim 10 further comprising:

radially mounted fins disposed between the inner and outer tubes.

12. The apparatus of claim 5 wherein the second heat exchanger includes:

an annular passage along which fuel to be cooled may pass.

13. The apparatus of claim 12 further comprising:

a turbulator within the heat exchanging tube to promote heat transfer.

14. The apparatus of claim 13 further comprising:

radially mounted fins within the turbulator to promote heat transfer.

15. The apparatus of claim 5 wherein the second heat exchanger includes:

an inner tube having an internal passage along which warm gas may pass;

an outer concentric tube surrounding the inner tube along which warm gas may pass; and an annular passage supported between the inner and outer tubes through which fuel to be warmed may pass.

16. The apparatus of claim 15 wherein each end of the vortex tube comprises:

radially mounted fins within the inner tube.

17. The apparatus of claim 16 further comprising:

radially mounted fins disposed between the inner and outer tubes.

18. An apparatus for cooling fuel in a fuel system of a vehicle, comprising:

a vortex tube connected to a supply of compressed gas so that the gas rapidly expands and cools, thereby cooling a first end of the vortex tube in relation to a warmer second end of the vortex tube;

a heat exchanger in thermal communication with the first end.

19. The apparatus of claim 18 wherein the heat exchanger includes:

at least one row of tubes through which the fuel may pass; and a serpentine fin supported between adjacent tubes, the fin defining a plurality of louvers therein, each louver forming an elongated slit through which the cold gas may pass.

20. The apparatus of claim 19 further comprising:

a corrugated edge formed on one or more of the louvers for creating turbulence in the cold air, thereby disturbing laminar flow of the air across the louvers and promoting a transfer of thermal energy between the fuel in the tubes and the cold air.

21. The apparatus of claim 19 wherein the heat exchanger further comprises:

a fuel inlet port provided upon an edge of the heat exchanger; and a fuel outlet port provided upon an adjacent edge thereof.

22. The apparatus of claim 19 wherein the heat exchanger further comprises:

a fuel inlet port provided upon an edge of the heat exchanger; and a fuel outlet port provided upon the same edge as the fuel inlet port.

23. A method for heat transfer in the fuel of a fuel system, comprising:

connecting a supply of compressed gas to a gas inlet port of an air amplifier so that the gas rapidly expands and cools, thereby cooling a first end of the air amplifier through delivery of a large volume of ambient air thereto;

attaching a first heat exchanger to the first end of the air amplifier;

providing a first fuel inlet port in the first heat exchanger so that fuel flowing into the first fuel inlet port is cooled by thermal contact with the first end of the air amplifier; and providing a cooled fuel outlet port in the first heat exchanger so that cooled fuel may leave the first heat exchanger.

* * * * *